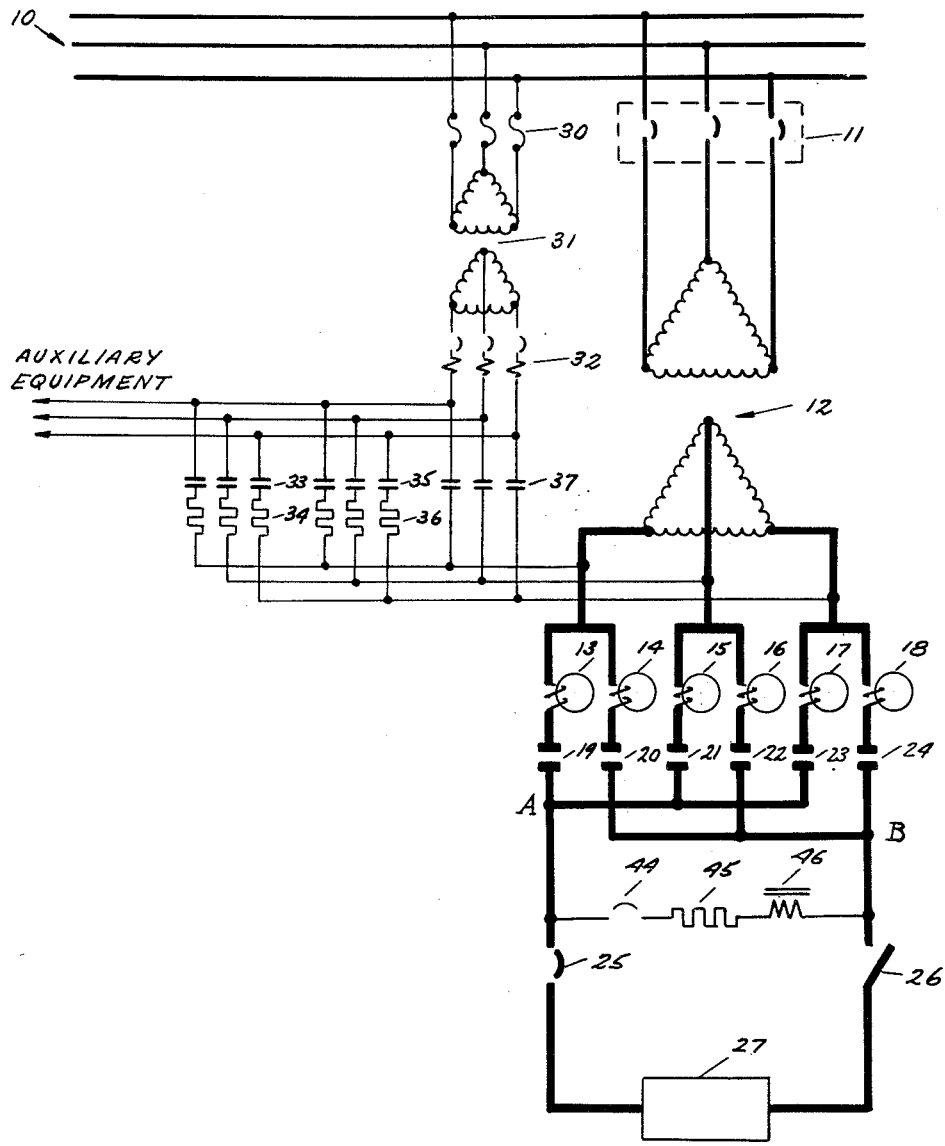

2,782,360

STARTING CIRCUIT FOR MECHANICAL RECTIFIERS

John A. Kuzmack, Havertown, Pa., assignor to I-T-E Circuit Breaker Company, Philadelphia, Pa., a corporation of Pennsylvania Application January 24, 1955, Serial No. 483,497

8 Claims. (Cl. 321—48)

My invention relates to a starting circuit for mechanical rectifiers.

Mechanical rectifiers to which my invention is directed are clearly described in copending applications such as Serial No. 307,024, filed August 29, 1952, Serial No. 307,067, filed August 29, 1952, Serial No. 331,467, filed January 15, 1953, Serial No. 361,670, filed June 15, 1953, and Serial No. 423,358, filed April 15, 1954, all assigned to the assignee of the instant application.

Mechanical rectifiers in general consist of three major components. The first is a power transformer, the second, commutating reactors and the third, cooperating contacts, and a mechanism to drive the cooperating contacts into and out of engagement.

Rectification is accomplished by synchronously opening and closing the cooperating contacts with a mechanical linkage driven by a synchronous motor connected to the A.-C. voltage to be rectified.

A commutating reactor which is a saturable type reactor is in series with the contacts and operates to create a low current step during the time the contact is opened or closed.

Mechanical rectifiers in general have an inherent starting problem. This problem is independent of the construction of the mechanical rectifier itself and of the circuitry used in the mechanical rectifier, the transformer and the arrangement of the component parts. For instance, starting the transformer and the synchronous drive simultaneously with all of the connections of the circuit closed will result in a short-circuit because the synchronous motor can not start fast enough to insure proper operation of the rectifier. That is, the cooperating contact will not engage and disengage in proper synchronism to the power transformer voltage.

If the synchronous motor is operated over an auxiliary transformer and independent contactor or circuit breaker, then the mechanical linkage will properly operate the contacts before the main power transformer is energized. When the main transformer is then subsequently energized, the rectifier will back-fire because the high in-rush current needed to magnetize the transformer will produce transient currents through the cooperating contacts which they are unable to handle. These transient currents and transient voltages are very large and are inherent to the power transformer and will always prevent the correct starting of a mechanical rectifier.

This problem has been overcome in the prior art by physically disconnecting the secondary side of the main power transformer from the A.-C. side of the rectifier. This has been accomplished by using a very large disconnecting switch in the secondary power line leading from the transformer to the commutating reactor or from the commutating reactors to the contacts. Such a disconnect switch has to handle the full load current of the rectifier for as long as the rectifier is in operation. Accordingly, this switch is extremely heavy, is very expensive to manufacture, has high losses due to contact resistance and copper resistance and presents a high reactance in the commutating circuit which is very undesirable for the operation of a mechanical rectifier since it prolongs the overlap.

When using a disconnect switch to start the mechanical rectifier, the disconnect switch is open when the mechanical contact device is started and the main transformer is energized. The open contacts of the disconnect switch prevent current flow from the transformer secondary to the rectifier. However, a disconnect switch can not be manufactured accurately enough such that each secondary phase is closed simultaneously. Therefore, other means must be used in conjunction with the disconnect switch to prevent back-fire which would occur when less than all the phases are simultaneously closed.

In order to overcome this inaccuracy in closing speed of the disconnect switch, each switch contact is by-passed by small contactors or circuit breakers in series with resistors. In fact, each of the disconnect switch contacts are normally by-passed by a parallel arrangement of series resistors and contactors such that by sequentially closing the contactors, the parallel resistance to the switch contact can be varied from a high resistance to a low resistance and eventually to a short-circuit of the switch contacts. It is then possible to close the main disconnect switch.

During this closing operation, the D.-C. side of a mechanical rectifier is connected to a dummy load or base load which permits a small current to flow. This type base load circuit can be of the type disclosed in copending application Serial No. 497,744, filed March 29, 1955, assigned to the assignee of the instant application.

Once the rectifier is correctly adjusted for operation on this base load and the disconnect switch is closed, then the above mentioned by-passing contactors around the disconnect switch contacts can be opened and the main D.-C. circuit breaker of the rectifier can be closed to permit normal load operation of the rectifier.

Starting mechanical rectifiers with the above mentioned type of motor operated heavy disconnect switch is made automatic in conjunction with its by-passing contactors which leads to an intricate relaying and protecting system. During the starting process, failures of the rectifier are not uncommon thereby resulting in extremely high back-fire currents which are limited only by the very small impedance of the main power transformer. The starting contactors, the disconnect switch and the cooperating contacts of the mechanical rectifier can be severely damaged if the mechanical rectifier fails during the starting cycle.

Since the main transformer has to carry the high load current when the rectifier is operating normally, it can not be made with a high impedance and thus, the large fault current can not be prevented.

In summary, the prior art method of overcoming the starting problem of the mechanical rectifiers uses a very heavy, expensive disconnect switch which has inherent high losses of power and voltage. Furthermore, the use of this type disconnect switch requires a motor drive, by-passing contactors, protective relays and fuses and other expensive complicated equipment.

If, during the starting cycle, a fault occurs on the mechanical rectifier, this equipment is subject to severe damage.

The principle of my invention is to substitute in place of the main power transformer, for starting purposes, an auxiliary transformer having a high inherent impedance and in series with variable current limiting resistors.

During starting, the mechanical rectifier is energized from the auxiliary transformer and the main power transformer secondary is also energized from the auxiliary transformer. Therefore, starting transients in the mechanical rectifier are limited by the resistors in series with the auxiliary transformer and transient conditions in the main power transformer upon its energization are limited since the transformer has been previously correctly energized.

In applying this principle to a mechanical rectifier, the main transformer is de-energized by having the primary circuit breaker open. The rectifier is then started and the main power transformer is magnetized at the same time by energizing the secondary side of the transformer through an auxiliary high impedance and high resistance source.

The main power transformer in-rush current, therefore, will be limited by the high impedance of the auxiliary source and the high resistance in the circuit. Transient currents through the main power transformer and transient currents through the rectifier are limited in magnitude by the impedance of the auxiliary transformer and damped by the resistance in series with the auxiliary transformer. When these transients have decreased, the resistance in the auxiliary circuit is lower and finally eliminated.

The main power transformer is now properly excited from the secondary side but still through a high impedance source. If a back-fire or short-circuit occurs, this high impedance source will limit the fault currents to a very low magnitude until protective devices can disconnect the circuit completely and the starting can be repeated without damage to any equipment.

If the starting is successful, that is, the transformer is properly energized from the auxiliary source and the rectifier operates and produces direct current in the base load, then the main circuit breaker on the primary side of the main power transformer can be closed without transients because the transformer is already magnetized in the proper direction. The auxiliary starting circuits can then be completely disconnected. Therefore, on starting the mechanical rectifier through a small auxiliary high resistance source with the main power supply disconnected, and subsequently lowering this resistance to zero, the main power supply which has a low reactance, low resistance source can then be connected to the rectifier and the auxiliary source disconnected from the rectifier.

In view of the foregoing remarks, it is a primary object of my invention to provide a starting circuit for mechanical rectifiers which replaces the main power transformer by a high impedance, high resistance source until the mechanical rectifier is correctly started.

Another object of my invention is to provide a starting circuit for mechanical rectifiers in which the main power transformer is magnetized in the proper direction to thereby prevent transient currents and voltages when the main power transformer is energized from the main power supply.

Still another object of my invention is to provide means for mechanical rectifiers in which the short-circuit current during a fault in the starting cycle will be limited to a small value.

Still another object of my invention is to provide means for starting mechanical rectifiers which are cheap, take up small volume, and are self-protecting.

These and other objects of my invention will be apparent from the following description when taken in connection with the figure in which the complete starting circuit for a three-phase double-way six coil mechanical rectifier is illustrated.

The choice of this type connection was purely arbitrary and my novel starting circuit has universal application to mechanical rectifier circuits.

In the figure, high voltage A. C. power line 10 supplies power to the mechanical rectifier through circuit breakers 11 and main power transformer 12. The secondary of main power transformer 12 is connected to six commutating reactors 13 through 18, respectively, which are in turn connected to mechanically driven contacts 19 through 24. For simplicity, I have shown only the basic diagram of mechanical rectifier and eliminated control circuits and the mechanical driving means for the contacts 19 through 24, etc.

Under normal operating conditions, circuit breaker 11 is closed and the main power transformer 12 and the secondary winding of main power transformer 12 is energized. Commutating reactors 13 through 18 are saturated when high current flows through them and operate in such a way as to be unsaturated to thereby produce a protective step for contacts 19 through 24 when they are being opened or closed.

Contacts 19 through 24, when closed, carry current from the secondary of the main power transformer 12 to the D. C. load 27 and when opened, the voltage of main power transformer 12 falls across them.

My novel starting circuit is shown in the figure as comprising the same high voltage power supply 10, high voltage fuses 30 and an auxiliary transformer 31. Auxiliary transformer 31 is then connected through a small low voltage circuit breaker 32, starting contactors 33, 35 and 37 and resistors 34 and 36. The corresponding phases of the secondary and auxiliary transformer 31 are then subsequently connected to the secondary winding of power transformer 12.

The base load circuit which is used as the load under starting conditions is shown as circuit breaker 44, resistor 45 and inductor 46.

The operation of the circuit is as follows.

Circuit breaker 11 is open to thereby disconnect the main transformer 12 from the high voltage line. The disconnect switch is closed and circuit breaker 25 is open. The small circuit breaker 44 is closed to thereby provide a high resistance load for the rectifier. The inductor 46 is in the base load circuit to thereby permit the commutating reactors of the mechanical rectifier to operate properly by smoothing the ripple in the D.-C. current.

In the starting circuit, the contactors 33, 35 and 37 are iniitally in the open position. The rectifier system is now ready for operation which is initiated by closing the small circuit breaker 32.

Three contacts 19, 21 and 23 connect the secondary of the power transformer 12 to a positive terminal A and contact 20, 22 and 24 connect the secondary of power transformer 12 to the negative terminal B of the rectifier.

Positive terminal A is shown containing a high speed circuit breaker 25 and negative terminal B is shown as containing a D.-C. disconnect switch 26. The main rectifier then supplied D.-C. power to load 27.

It should be noted that the closing of circuit breaker 32 can also initiate the energization of other auxiliary equipment such as the contact drive mechanism, cooling systems, etc. A complete description of the auxiliary equipment used in the mechanical rectifier can be found in the above mentioned copending applications. Hence, the mechanical rectifier mechanism is now operating and all the auxiliaries are ready to take over their normal function although the rectifier is still de-energized.

By closing the contactor 33, the rectifier transformer 12 is excited from the secondary side through the resistor 34. The in-rush current taken by transformer 12, if energized from the secondary side, would be extremely large, but resistor 34 limits this current. For instance, in a typical application, resistor 34 would have a resistance of approximately 3½ ohms thereby limiting the maximum in-rush current to transformer 12 to 50 amperes rather than the several thousand amperes if there were no resistor limiting the current.

The limited current furnished through transformer 12 neverthelss magnetizes the transformer and produces A.-C. voltage on the A.-C. side of the rectifier which is rectified by contacts 19 through 24 to produce a small direct current flowing through the base load circuit of resistor 45 and inductor 46.

After a very short time, all transients will have subsided and contactor 35 is closed. Closing contactor 35 which is in series with resistors 36 will then further decrease the total resistance per phase. Hence, the current delivered by the circuit through the secondary of transformer 31 now rises and the D. C. voltage produced by the rectifier can rise accordingly since a larger current excites transformer 12.

After the closing of contactor 35, contactor 37 is closed to short-circuit resistors 34 and 36 and feeds the secondary of transformer 12 only through the current limiting impedance of the auxiliary transformer 31.

The main rectifier now operates at almost rated voltage in view of the higher current exciting transformer 12. If, during the starting sequence, fault conditions occur on the rectifier, such as a back-fire which would produce a short-circuit between the phases, the fault current will be limited by the impedance of transformer 31 and circuit breaker 32 will immediately interrupt this fault current.

Since transformer 31 must furnish only a relatively small power, its maximum short-circuit current could be less then the rated current power phase of the rectifier. Hence, a fault during starting can only produce slight damage before the small circuit breaker 32 opens the circuit.

If the starting process is successful, the rectifier operates through transformer 31, circuit breaker 32, contactor 37 and the rectifier proper to the base load circuit to resistor 45 and inductor 46.

The main power transformer 12 is fully magnetized from the secondary side since it draws a large magnetizing current through the auxiliary transformer 31. Circuit breaker 11 is subjected to the full primary voltage on both sides from the A. C. source 10 directly and indirectly through the transformer 12.

Closing circuit breaker 11 causes very little change in the behavior of the circuit. The small rated current supplied by auxiliary transformer 31 can now be interrupted by opening contactors 33, 35 and 37 and the rectifier now operates normally with the starting circuit completely disconnected and auxiliary transformer 31 supplying power for the auxiliary circuits.

After circuit breaker 11 is closed and the rectifier properly energizes base load resistor 45 and inductor 46, it can subsequently be connected to the D. C. load 27 by closing the D. C. circuit breaker 25 and opening the small D. C. circuit breaker 44.

It should be noted that one of the major advantages of my novel starting circuit is that I provide a starting through a small high impedance transformer and subsequently energize the main power transformer only when starting has been successful.

Upon unsuccessful starting, fault current is limited by the high impedance of the auxiliary circuit thereby causing little damage to the associated equipment.

In the foregoing, I have described my invention only in connection with preferred embodiments thereof. Many variations and modications of the principles of my invention within the scope of the description herein are obvious. Accordingly, I prefer to be bound not by the specic disclosure herein but only by the appending claims.

I claim:

1. In a mechanical rectifier energizing a D. C. load from an A. C. source; a first and a second transformer having primary and secondary windings; commutating reactors and cooperating contacts; said first and second transformer primary windings connectible to said A. C. source; each of said first transformer secondary windings forming a closed series connection with one of said commutating reactors, one of said cooperating contacts and said D. C. load; each of said second transformer secondary windings connected to energize said first transformer secondary winding before said first transformer primary winding is connected to said A. C. source and forming a closed series connection with one of said commutating reactors, cooperating contacts, said D. C. load and a variable impedance.

2. In a mechanical rectifier energizing a D.-C. load from an A.-C. source; a first and a second transformer having primary and secondary windings; commutating reactors and cooperating contacts; said first and second transformer primary windings connectible to said A.-C. source; each of said first transformer secondary windings forming a closed series connection with one of said commutating reactors, one of said cooperating contacts and said D.-C. load; each of said second transformer secondary windings connected to energize said first transformer secondary winding before said first transformer primary winding is connected to said A.-C. source and forming a closed series connection with one of said commutating reactors, cooperating contacts, said D.-C. load and a parallel connection of a plurality of series connected resistors and switches.

3. In a mechanical rectifier energizing a D.-C. load from an A.-C. source; a first and a second transformer having primary and secondary windings; commutating reactors and cooperating contacts; said first and second transformer primary windings connectible to said A.-C. source; each of said first transformer secondary windings forming a closed series connection with one of said commutating reactors, one of said cooperating contacts and said D.-C. load; each of said second transformer secondary windings connected to energize said first transformer primary windings before said first transformer primary winding is connected to said A.-C. source and forming a closed series connection with one of said commutating reactors, cooperating contacts, said D.-C. load and a variable impedance; said second transformer constructed to have a lower short circuit current than said first transformer.

4. In a mechanical rectifier energizing a D.-C. load from an A.-C. source; a first and a second transformer having primary and secondary windings; commutating reactors and cooperating contacts; said first and second transformer primary windings connectible to said A.-C. source; each of said first transformer secondary windings forming a closed series connection with one of said commutating reactors, one of said cooperating contacts and said D.-C. load; each of said second transformer secondary windings connected to enegize said first transformer secondary winding before said first transformer primary winding is connected to said A.-C. source and forming a closed series connection with one of said commutating reactors, cooperating contacts, said D.-C. load and a variable impedance; said variable impedance comprising a first and second resistor and a first and second switch in series with said first and second resistor respectively; said first resistor and first switch connected in parallel to said second resistor and second switch, said second transformer constructed to have a lower short circuit current than said first transformer.

5. In a starting circuit for a mechanical rectifier, said mechanical rectifier having a multiphase main power transformer, said multiphase main power transformer having a primary and a secondary winding; an auxiliary transformer having a primary and a secondary winding; each phase of said auxiliary transformer secondary being connected in series with a variable impedance and the corresponding phase of said main power transformer secondary winding; said primary windings of said auxiliary transformer being connected to an A.-C. source before said primary windings of said main transformer are connected to said A.-C. source, to thereby pre-magnetize said main transformer and substantially eliminate starting transients therein.

6. In a starting circuit for a mechanical rectifier, said mechanical rectifier having a multiphase main power transformer, said multiphase main power transformer having a primary and a secondary winding; an auxiliary transformer having a primary and a secondary winding; said auxiliary transformer constructed to have a lower short circuit current than that of said main transformer;

each phase of said auxiliary secondary transformer being connected in series with a variable impedance and the corresponding phase of said main power transformer secondary winding; said primary windings of said auxiliary transformer being connected to an A.-C. source before said primary windings of said main transformer are connected to said A.-C. source, to thereby pre-magnetize said main transformer and substantially eliminate starting transients therein.

7. In a starting circuit for a mechanical rectifier, said mechanical rectifier having a main power transformer, said main power transformer having a primary and a secondary winding; an auxiliary transformer having a primary and a secondary winding; said auxiliary transformer constructed to have a lower short circuit current than that of said main transformer; each phase of said auxiliary transformer secondary connected in series with a parallel connection of a first and second resistor, said first and second resistor in series with a switching means, and the corresponding phase of said main power transformer secondary winding; said primary windings of said main transformer and said auxiliary transformer selectively connectible to an A.-C. source.

8. In a starting circuit for a mechanical rectifier, said mechanical rectifier having a main power transformer, said main power transformer having a primary and a secondary winding; an auxiliary transformer having a primary and a secondary winding; said auxiliary transformer constructed to have a lower short circuit current than that of said main transformer; each phase of said auxiliary transformer secondary connected in series with a parallel connection of a first and second resistor, said first and second resistor in series with a switching means, and the corresponding phase of said main power transformer secondary winding; means to energize said auxiliary transformer from a main A.-C. source before said main transformer primary winding is connected to said main A.-C. source.

References Cited in the file of this patent

UNITED STATES PATENTS 1,007,480  North et al. _____ Oct. 31, 1911